United States Patent
Utsumi

(12) 
(10) Patent No.: US 6,725,843 B2
(45) Date of Patent: Apr. 27, 2004

(54) FUEL INJECTION PUMP HAVING FEED PUMP ASSEMBLY

(75) Inventor: Yasutaka Utsumi, Kariya (JP)

(73) Assignee: Denso Corporation, Kariya (JP)

( * ) Notice: Subject to any disclaimer, the term of this patent is extended or adjusted under 35 U.S.C. 154(b) by 13 days.

(21) Appl. No.: 10/301,585

(22) Filed: Nov. 22, 2002

(65) Prior Publication Data

US 2003/0101970 A1 Jun. 5, 2003

(30) Foreign Application Priority Data

Dec. 4, 2001 (JP) ........................... 2001-369776

(51) Int. Cl.[7] ................. F02M 37/04; F04B 39/00
(52) U.S. Cl. ........................... 123/495; 417/372
(58) Field of Search ................. 123/495; 417/368, 417/372

(56) References Cited

U.S. PATENT DOCUMENTS

| | | | |
|---|---|---|---|
| 3,873,243 A | * 3/1975 | Nusser et al. | 417/368 |
| 4,697,565 A | * 10/1987 | Kobayashi et al. | 123/449 |
| 5,000,668 A | * 3/1991 | Nakamura et al. | 123/509 |
| 5,007,400 A | * 4/1991 | Babitzka | 123/506 |
| 5,146,895 A | * 9/1992 | Fehlmann et al. | 123/449 |

FOREIGN PATENT DOCUMENTS

JP 8049619 2/1996

* cited by examiner

Primary Examiner—Thomas N. Moulis
(74) Attorney, Agent, or Firm—Nixon & Vanderhye P.C.

(57) ABSTRACT

In a fuel injection pump, fuel discharged from a feed pump assembly is supplied to each pressurizing chamber through a corresponding metering valve. A portion of the fuel is supplied to a receiving chamber, which receives a drive mechanism that drives plungers, through a space defined between a drive shaft and a bush, which supports the drive shaft. A fuel groove is formed in an inner wall of the bush, so that fuel supplied from the feed pump assembly to the receiving chamber through the fuel groove is also supplied to lubricate between an outer wall of the drive shaft and the inner wall of the bush.

10 Claims, 5 Drawing Sheets

FUEL INJECTION PUMP HAVING FEED PUMP ASSEMBLY

CROSS REFERENCE TO RELATED APPLICATION

This application is based on and incorporates herein by reference Japanese Patent Application No. 2001-369776 filed on Dec. 4, 2001.

BACKGROUND OF THE INVENTION

1. Field of the Invention

The present invention relates to a fuel injection pump of an internal combustion engine (hereinafter, simply referred to as "engine").

2. Description of Related Art

For example, a previously proposed common rail type fuel injection system for a diesel engine has a fuel injection pump for supplying pressurized fuel to a common rail. The fuel injection pump is driven by a drive shaft connected to a crankshaft of the engine. Rotational movement of the drive shaft is translated into reciprocal movement, for example, by a cam and is then transmitted to a plunger reciprocably supported in a cylinder. When the plunger is reciprocated, fuel in the pressurizing chamber is pressurized. A feed pump assembly, which supplies fuel to the pressurizing chamber, is integrated into the fuel injection pump. The feed pump assembly is also driven through rotation of the drive shaft to suction fuel from a fuel tank and discharges the fuel to the pressurizing chamber.

In the above described fuel injection pump, sliding surfaces are provided in the interior of a housing that defines the cylinder. More specifically, the sliding surfaces are provided, for example, between the cam and the plunger or between the plunger and a portion of the housing, which defines the cylinder. Thus, the fuel discharged from the feed pump assembly is not only supplied to the pressurizing chamber but is also supplied to the interior of the housing to lubricate the corresponding sliding surfaces of the sliding components.

In the previously proposed fuel injection pump, the fuel discharged from the feed pump assembly is supplied to the interior of the housing through a fuel passage, which extends through the housing.

However, in the previously proposed fuel injection pump, the lubricating fuel is supplied to the receiving chamber, which receives the cam, so that it is required to form an elongated through hole, which has a relatively small open cross-sectional area and extends from the feed pump assembly to the receiving chamber through the housing for supplying fuel. Furthermore, an orifice (or choke), which restrains a flow rate of fuel supplied to the receiving chamber, is formed in the fuel passage. Thus, manufacturing of such a fuel passage is tedious and time consuming, and a structure of the housing is accordingly complicated.

Furthermore, it is desirable to improve or increase a fuel injection pressure to improve engine power and also to reduce the amount of NOx emissions from the engine. However, when the fuel injection pressure is increased, a pressure applied to each corresponding component of the fuel injection pump is increased. Thus, lubrication of the sliding surfaces of the corresponding components of the fuel injection pump needs to be improved to restrain seizing of these components. In the fuel injection pump, the drive shaft is supported by the housing, so that lubrication is required not only between the cam and the plunger but is also required between the drive shaft and the housing.

SUMMARY OF THE INVENTION

The present invention addresses the above disadvantages. Thus, it is an objective of the present invention to provide a fuel injection pump, which has a simple structure and is capable of restraining seizing of its drive shaft and also capable of increasing a fuel discharge pressure.

To achieve the objective of the present invention, there is provided a fuel injection pump including at least one movable member for pressurizing fuel, a drive mechanism, a housing, a feed pump assembly, and a tubular member. The drive mechanism drives the at least one movable member and includes a drive shaft. The housing includes at least one cylinder and a receiving chamber, which are communicated with each other. Each cylinder reciprocably supports a corresponding one of the at least one movable member therein and defines a pressurizing chamber in cooperation with the corresponding movable member. The receiving chamber receives the drive mechanism. The feed pump assembly is driven by the drive shaft and pumps fuel to the pressurizing chamber. The feed pump assembly includes a discharge port, through which pressurized fuel is discharged from the feed pump assembly toward the pressurizing chamber. The tubular member is arranged between the drive shaft and the housing in a radial direction of the drive shaft and includes a fuel groove formed in an inner wall of the tubular member, which is in sliding contact with the drive shaft. The fuel groove communicates between the discharge port and the receiving chamber.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

One embodiment of the present invention will be described with reference to the accompanying drawings.

Figure 1:
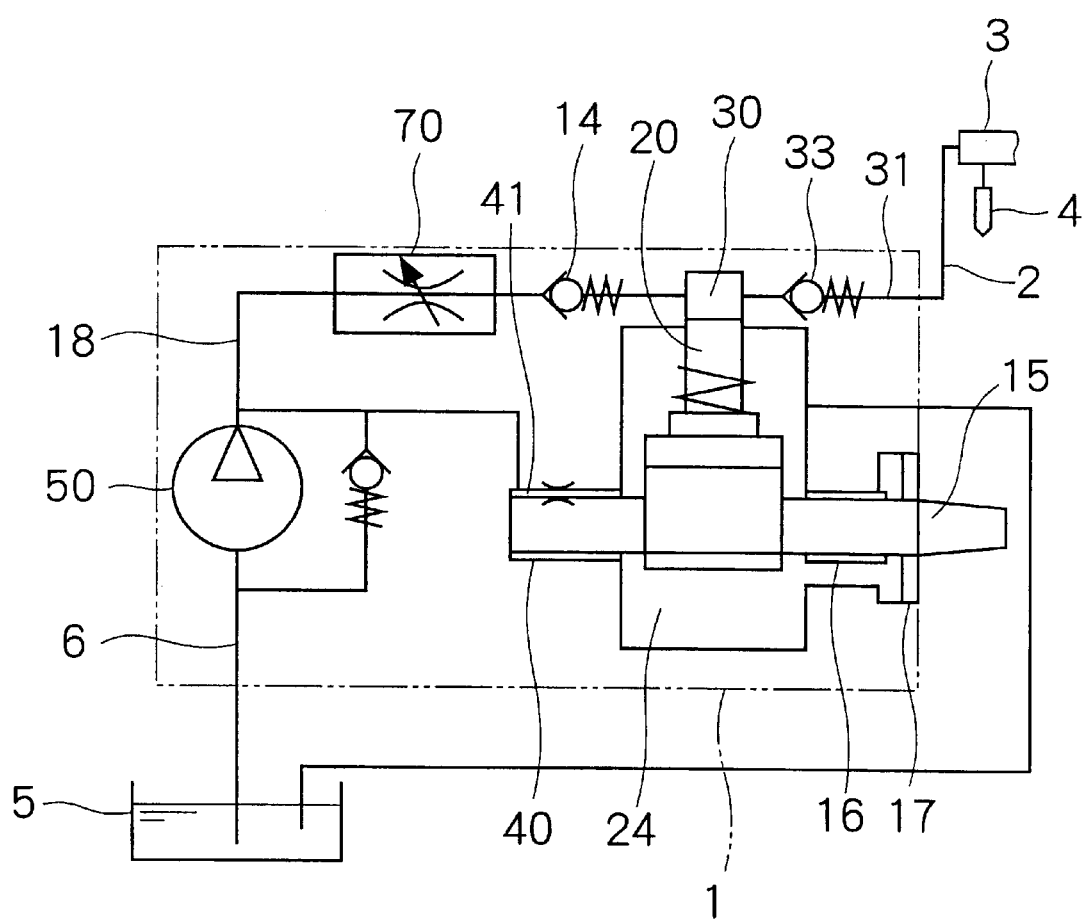
FIG. 1 is a schematic view of a fuel injection system having a fuel injection pump according to an embodiment of the present invention.

FIG. 1 shows a common rail type fuel injection system, in which a fuel injection pump 1 according to the embodiment is provided.

Figure 2:
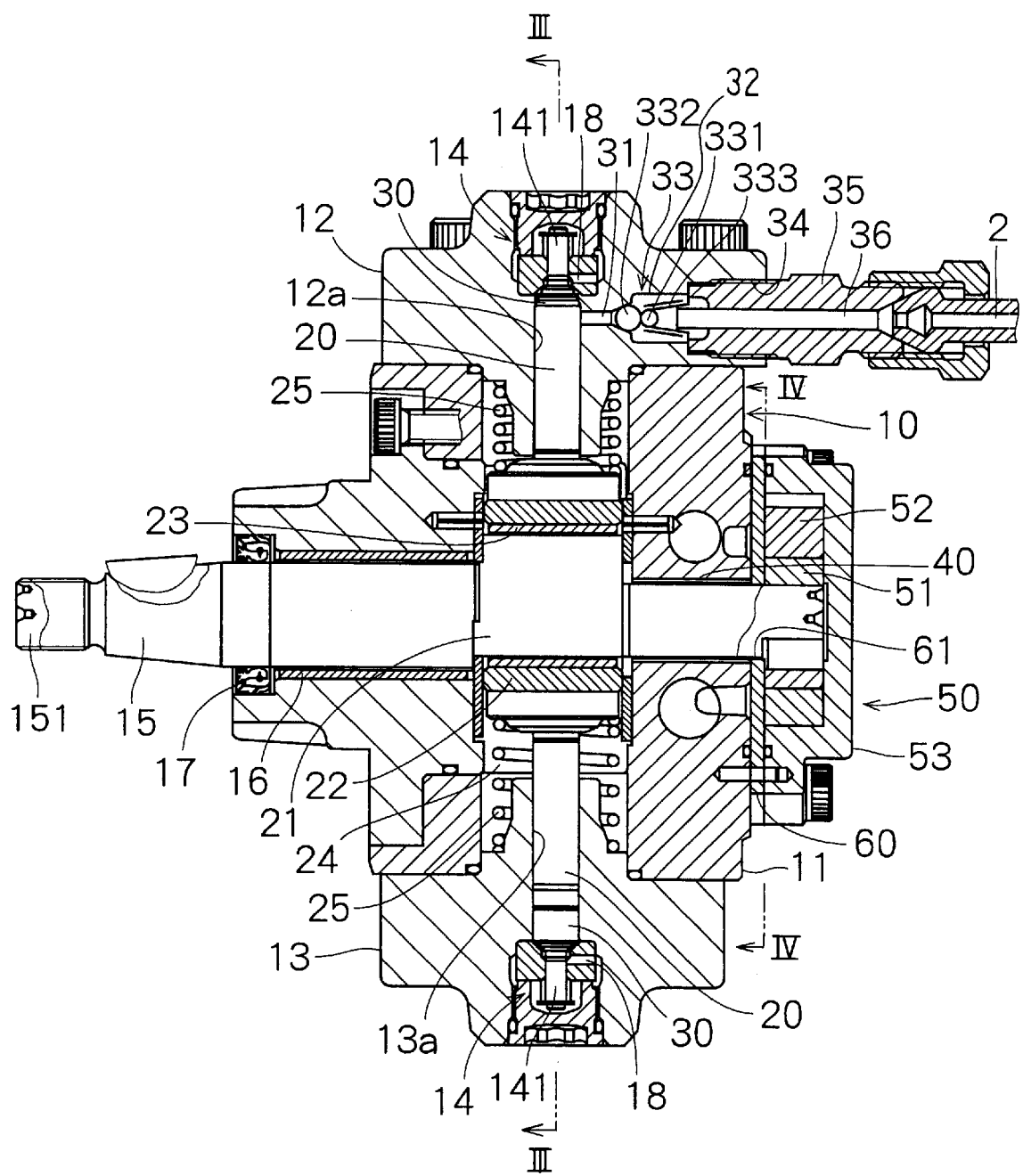
FIG. 2 is a schematic cross sectional view of the fuel injection pump of the embodiment.

With reference to FIG. 2, a housing 10 of the fuel injection pump 1 includes a housing main body 11 and cylinder heads 12, 13. The housing main body 11 is made of aluminum. Each cylinder head 12, 13 is made of iron and includes a cylinder 12a, 13a, in which a plunger 20 serving as a movable member is reciprocably received. An inner circumferential surface of each cylinder head 12a, 13a, an end surface of a corresponding check valve 14 and an end surface of the corresponding plunger 20 define a pressurizing chamber 30. In the present embodiment, although a shape of the cylinder head 12 and a shape of the cylinder head 13 are substantially the same, a position of a threaded hole, a position of a fuel passage and the like (described later) of the cylindrical head 12 are different from those of the cylindrical head 13. Alternatively, the position of the threaded hole, the position of the fuel passage and the like of the cylindrical head 12 can be modified to be the same as those of the cylindrical head 13, and the shape of the cylindrical head 12 is maintained the same as the shape of the cylindrical head 13.

Figure 3:
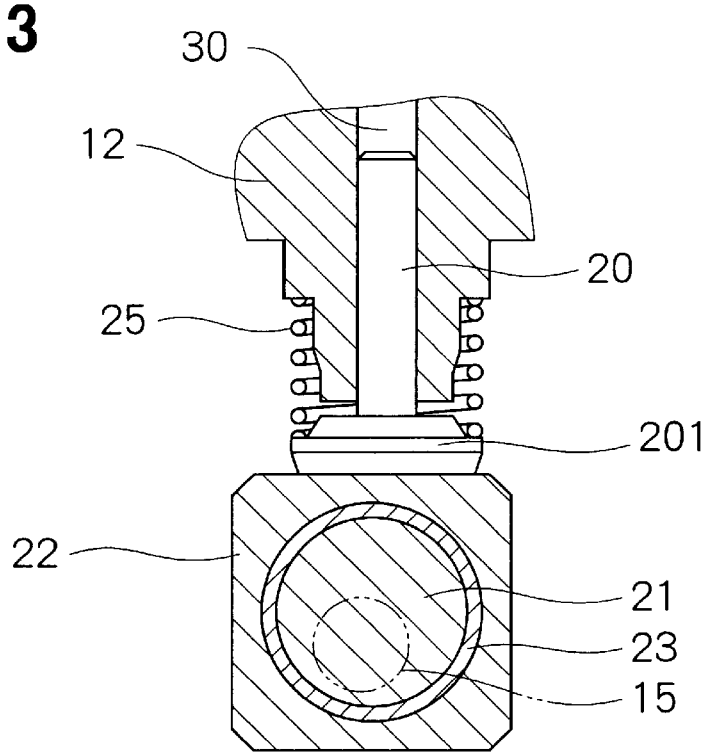
FIG. 3 is a partial cross sectional view along line III—III in FIG. 2, showing a cam and a plunger.

The drive shaft 15 is rotatably supported by the housing 10 by a journal 16 and a bush 40. A space between the housing 10 and the drive shaft 15 are sealed by an oil seal 17. As shown in FIG. 3, a cam 21 having a circular cross section is formed integrally with or is joined with the drive shaft 15 such that the axis of the cam 21 is eccentrically offset from the axis of the drive shaft 15. The plungers 20 are arranged on opposed sides of the drive shaft 15. A cam ring 22 is arranged radially outward of the cam 21, and an outer periphery of a cross section of the cam ring 22 is substantially quadrangular (or polygonal). A bush 23, which is slidable relative to both the cam ring 22 and the cam 21, is arranged between the cam ring 22 and the cam 21. Each outer surface of the cam ring 22, which is opposed to the corresponding plunger 20, is planar, and an opposed end surface of each plunger head 201 is also planar. The drive shaft 15, the cam 21 and the cam ring 22 serve as part of a drive mechanism (or drive means) for driving the plungers 20.

The plungers 20, the drive shaft 15, the cam 21 and the cam ring 22 are received in a receiving chamber 24, which is defined by the housing main body 11 and the cylinder heads 12, 13. The receiving chamber 24 is filled with light oil, which serves as fuel.

When the drive shaft 15 is rotated, each plunger 20 is reciprocated by the cam 21 through the cam ring 22 to pressurize fuel, which is supplied from a corresponding fuel inflow passage 18 into the corresponding pressurizing chamber 30 through the corresponding check valve 14. Each check valve 14 has a valve member 141 and prevents backflow of fuel from the pressurizing chamber 30 to the fuel inflow passage 18.

Each spring 25 urges the corresponding plunger 20 toward the cam ring 22. Besides the drive shaft 15, the cam 21 and the cam ring 22, the springs 25 also serve as part of the drive mechanism. When the cam 21 is rotated, the cam ring 22 slides relative to the cam 21 and revolves (i.e., not rotates). In this way, the cam ring 22 and the plungers 20, which serve as sliding portions, reciprocate and slide.

Each cylinder head 12, 13 has a fuel discharge passage 31, which extends linearly and is communicated with the corresponding pressurizing chamber 30.

An elongated hole like fuel chamber 32, which has a larger open cross-sectional area than the fuel discharge passage 31, is arranged downstream of the fuel discharge passage 31 in the cylindrical head 12. A check valve 33 is received in the fuel chamber 32. A receiving hole 34, which has a larger open cross-sectional area than the fuel chamber 32, is arranged downstream of the fuel chamber 32. The receiving hole 34 forms a fuel outlet, which has an opening in the outer wall surface of the cylinder head 12. A connecting member 35 for connecting between fuel passages is threadably received in the receiving hole 34. A fuel passage 36 is formed in the connecting member 35 and is communicated with the fuel chamber 32. The fuel passage 36 and the fuel discharge passage 31 extend generally along a common straight line.

The check valve 33, which is arranged downstream of the fuel discharge passage 31 of the cylinder head 12, includes a valve member 331, a valve seat member 332 and a spring 333. The valve member 331 is shaped as a ball. The valve member 331 is seatable against the valve seat member 332. The spring 333 urges the valve member 331 toward the valve seat member 332. The check valve 33 prevents backflow of fuel from the fuel chamber 32 and the fuel passage 36, which are located downstream of the check valve 33, to the pressurizing chamber 30 through the fuel discharge passage 31. The connecting member 35 is connected to a common rail 3 through a fuel line 2 shown in FIG. 1. Fuel, which is pressurized by the fuel injection pump 1, is supplied to the common rail 3 through the fuel passage 36 of the connecting member 35 and the fuel line 2. In the common rail 3, the fuel, which is discharged from the fuel injection pump 1, is accumulated while being pressurized. Each fuel injector 4, which is arranged in a corresponding cylinder of the engine, is connected to the common rail 3, and the pressurized fuel accumulated in the common rail 3 is supplied to each fuel injector 4. Each fuel injector 4 injects fuel, which is supplied from the common rail 3, into the corresponding cylinder at a predetermined timing for a predetermined time period based on an instruction from an ECU (not shown).

The cylinder head 13 is arranged on the lower side of the housing main body 11 in FIGS. 1 and 2. Similar to the cylinder head 12, a fuel discharge passage, a receiving hole and others are formed in the cylinder head 13 at each corresponding position which cannot be seen in FIG. 2, and a check valve, a connecting member and others are received in the cylinder head 13.

As shown in FIG. 2, a feed pump assembly 50 is arranged at one end of the drive shaft 15. The feed pump assembly 50 includes an inner rotor 51 and an outer rotor 52. The inner rotator 51 and the outer rotor 52 can rotate relative to each other. When the inner rotor 51 rotates together with the drive shaft 15, fuel is supplied from the fuel tank 5 shown in FIG. 1 to each pressurizing chamber 30. A transmitting portion 151 is formed on the other end of the drive shaft 15. The drive shaft 15 is rotated by drive force, which is transmitted from a crankshaft of the engine (not shown) to the transmitting portion 151.

The feed pump assembly 50 is received in a casing 53, which is detachably secured to the housing main body 11. The feed pump assembly 50 further includes a washer 60, which is arranged between and is engaged with the housing main body 11 and the casing 53.

Figure 4:
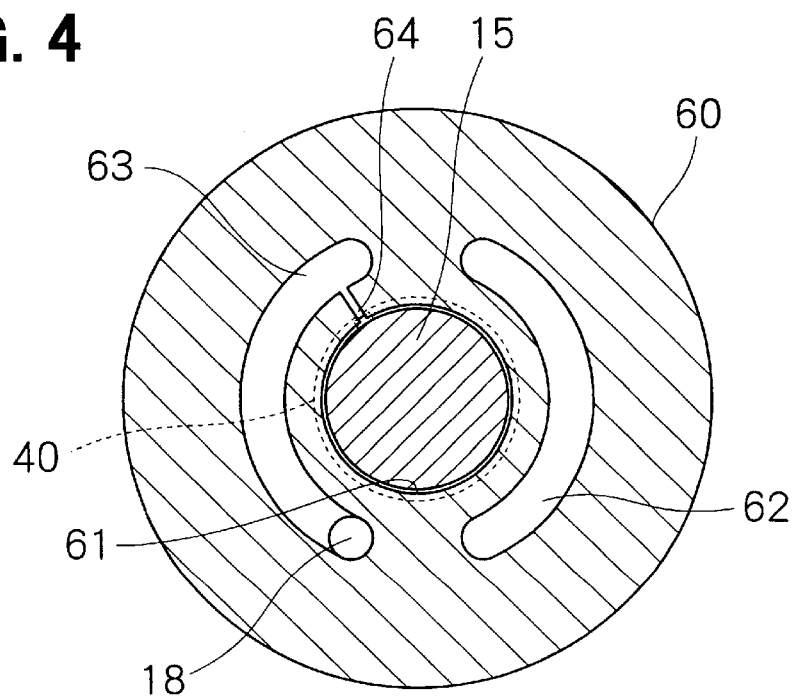
FIG. 4 is a cross sectional view along line IV—IV in FIG. 2.

The washer 60 is shaped as a disk and has a support hole 61, which is arranged at the center of the washer 60 to receive the drive shaft 15 in a rotatable manner, as shown in FIG. 4. An inner diameter of the support hole 61 is slightly larger than an outer diameter of the drive shaft 15. The drive shaft 15 can rotate in a circumferential direction in the support hole 61. An intake port 62 and a discharge port 63 are formed radially outward of the support hole 61. The intake port 62 has an arcuate shape extending in a circumferential direction and serves as a low pressure side port, through which fuel to be pressurized is taken into the feed pump assembly 50. The discharge port 63 has an arcuate shape extending in the circumferential direction and serves as a high pressure side port, through which pressurized fuel is discharged from the feed pump assembly 50. The intake port 62 and the discharge port 63 are generally symmetrically arranged about the support hole 61. The intake port 62 is communicated with a fuel passage 6, which supplies fuel from the fuel tank 5 shown in FIG. 1 to the fuel injection pump 1. The discharge port 63 is communicated with each fuel inflow passage 18, which supplies fuel pressurized in the feed pump assembly 50 to the corresponding pressurizing chamber 30. As shown in FIG. 1, a metering valve 70 is arranged in the fuel inflow passage 18, which connects between the feed pump assembly 50 and the pressurizing chamber 30. The metering valve 70 meters fuel supplied from the feed pump assembly 50 to the pressurizing chamber 30. When the inner rotor 51 rotates relative to the outer rotor 52, fuel, which is supplied from the fuel tank 5 to the intake port 62, is pressurized and is discharged into the pressurizing chamber 30 through the discharge port 63. A fuel passage 64 is communicated with the discharge port 63. The fuel passage 64 communicates between the discharge port 63 and the support hole 61. In this way, a portion of fuel, which is pressurized by the feed pump assembly 50 and is discharged through the discharge port 63, is supplied to the support hole 61 through the fuel passage 64.

Figure 5:
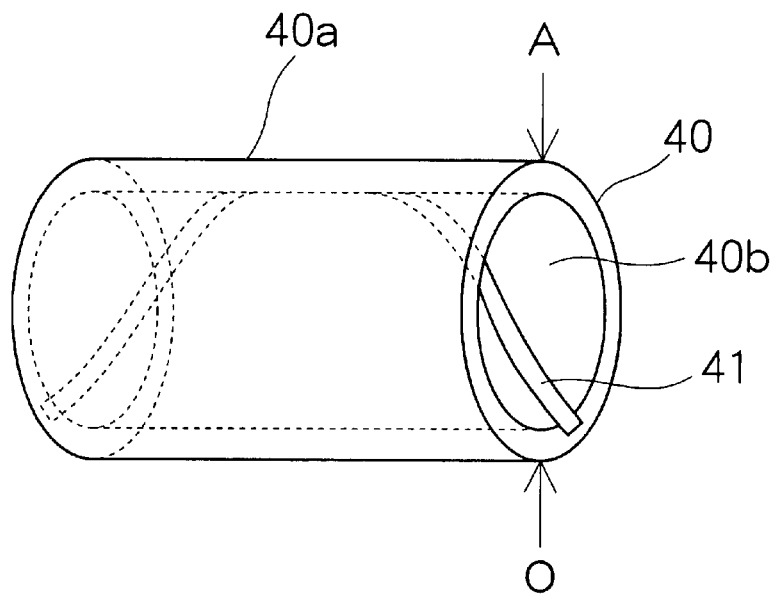
FIG. 5 is a schematic perspective view of a bush of the fuel injection pump of the embodiment.

As shown in FIG. 2, the bush 40, which serves as a tubular member, is arranged between the housing main body 11 and the drive shaft 15. With reference to FIG. 5, the bush 40 is shaped as a cylinder. An outer wall 40*a* of the bush 40 is engaged with the housing main body 11. The drive shaft 15 is rotatably supported in the bush 40, and an outer wall surface of the drive shaft 15 is in sliding contact with an inner wall 40*b* of the bush 40, so that the drive shaft 15 can slide relative to the bush 40. One end of the bush 40, which is opposite to the receiving chamber 24, is engaged with the washer 60.

Figure 6:
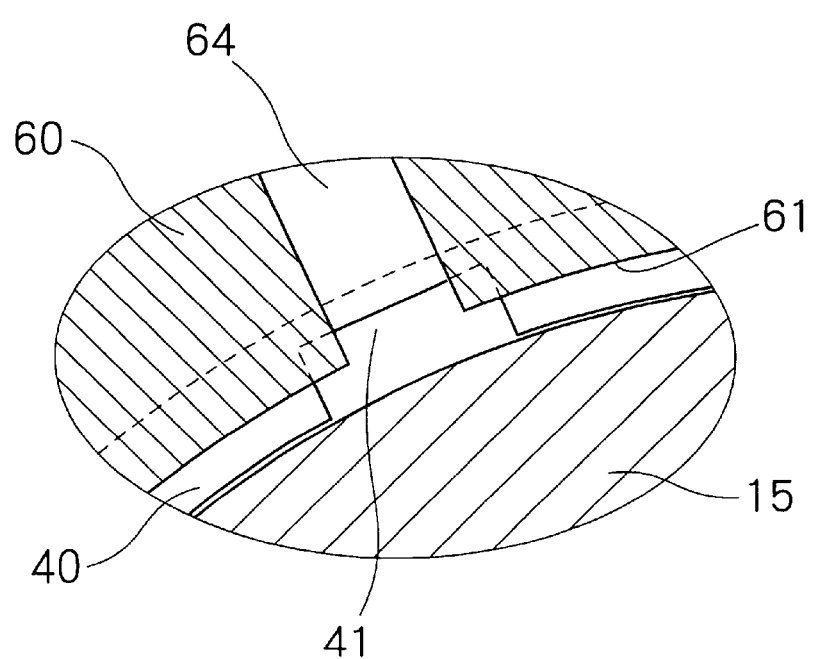
FIG. 6 is a partial enlarged view of FIG. 4.
Figure 7:
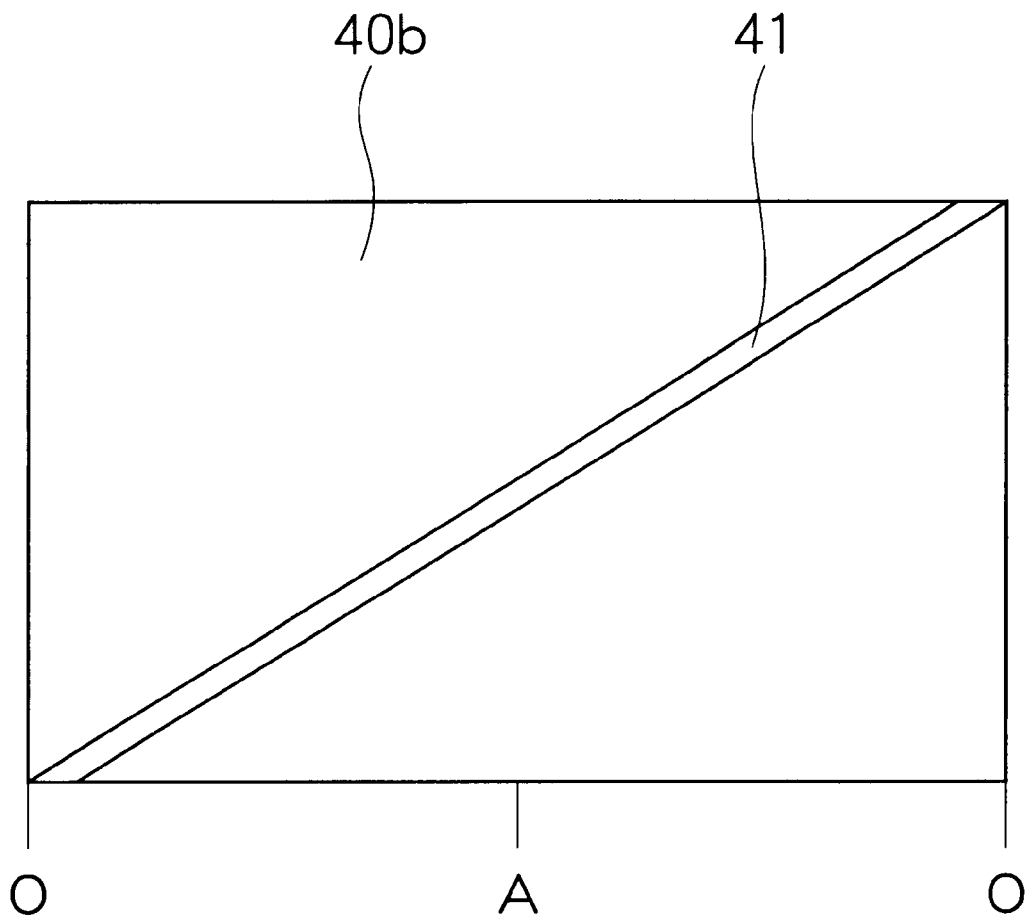
FIG. 7 is a schematic developed view of the bush along O-A-O in FIG. 5.

As shown in FIGS. 5 and 6, a fuel groove 41 is formed in the inner wall 40*b* of the bush 40. The fuel groove 41 extends from the one end of the bush 40, which is on the washer 60 side thereof, to the other end of the bush 40, which is on the receiving chamber 24 side thereof. As shown in FIG. 6, the washer 60 side end of the fuel groove 41 is positioned to correspond with the fuel passage 64 formed in the washer 60. In this way, the washer 60 side end of the fuel groove 41 is communicated with the fuel passage 64. The fuel groove 41 extends at a predetermined angle relative to the central axis of the drive shaft 15. That is, as shown in FIG. 7, when the inner wall 40*b* of the bush 40 is developed in the circumferential direction, the fuel groove 41 extends at the predetermined angle relative to the drive shaft 15. Thus, the fuel groove 41, which is formed in the inner wall 40*b* of the bush 40, extends helically around the drive shaft 15, as shown in FIG. 5.

Since the end of the bush 40 is received in the receiving chamber 24, the end of the fuel groove 41, which is opposite to the fuel passage 64, is communicated with the receiving chamber 24. In this way, a portion of the fuel, which is pressurized by the feed pump assembly 50, is supplied from the discharge port 63 to the receiving chamber 24 through the fuel passage 64 and the fuel groove 41. Since the fuel passage 64 is communicated with the discharge port 63, the portion of the fuel, which is pressurized by the feed pump assembly 50, is supplied to the fuel groove 41. Since the fuel in the discharge port 63 is pressurized, the fuel is forcefully supplied from the discharge port 63 to the fuel groove 41.

An open cross-sectional area of the fuel passage 64 for conducting fuel is smaller than that of the fuel groove 41. Thus, when fuel is supplied from the discharge port 63 to the fuel passage 64, a flow rate of fuel is reduced before the fuel enters the fuel groove 41. Thus, the fuel passage 64 serves as an orifice for reducing a flow rate of fuel.

Next, operation of the fuel injection pump 1 will be described.

When the drive shaft 15 is rotated, the inner rotor 51 of the feed pump assembly 50 is rotated relative to the outer rotor 52 to drive the feed pump assembly 50. When the feed pump assembly 50 is driven, fuel stored in the fuel tank 5 shown in FIG. 1 is supplied to the feed pump assembly 50 through the fuel passage 6. In the feed pump assembly 50, the relative rotation between the inner rotor 51 and the outer rotor 52 causes pressurization of fuel. The pressurized fuel is supplied to the fuel inflow passage 18, which is communicated with the discharge port 63, and is then supplied to the pressurizing chamber 30. A flow rate of fuel, which is supplied from the feed pump assembly 50 to the pressurizing chamber 30, is adjusted by the metering valve 70.

A portion of fuel, which is pressurized by the feed pump assembly 50, is supplied from the discharge port 63 of the washer 60 to the support hole 61 through the fuel passage 64 and is then supplied to the fuel groove 41, which is communicated with the fuel passage 64. The fuel, which is supplied to the fuel groove 41, flows along the fuel groove 41 between the outer wall of the drive shaft 15 and the inner wall 40*b* of the bush 40 toward the receiving chamber 24. In this way, the portion of fuel, which is pressurized by the feed pump assembly 50, is supplied to the receiving chamber 24. Furthermore, the fuel, which flows along the fuel groove 41, forms an oil layer or film between the outer wall of the drive shaft 15 and the inner wall 40*b* of the bush 40. Since the fuel groove 41 extends helically around the drive shaft 15, a uniform oil layer or film, which is uniform in both the axial direction and circumferential direction of the drive shaft 15, is formed between the outer wall of the drive shaft 15 and the inner wall 40*b* of the bush 40.

With reference to FIG. 1, fuel, which has passed the metering valve 70, is suctioned into the pressurizing chamber 30 when the plunger 20 moves downwardly in the corresponding cylinder 12*a*, 13*a* upon rotation of the drive shaft 15. At this time, fuel pushes the check valve 14 and opens the check valve 14, so that the fuel flows into the pressurizing chamber 30. When the plunger 20 moves upwardly in the corresponding cylinder 12*a*, 13*a*, the fuel in the pressurizing chamber 30 is pressurized. Then, when a pressure of fuel in the pressurizing chamber 30 reaches a predetermined value, the check valve 33 of the fuel discharge passage 31, which is communicated with the pressurizing chamber 30, is opened, so that the fuel in the pressurizing chamber 30 is discharged to the common rail 3. In the common rail 3, the fuel of fluctuating pressures supplied from the fuel injection pump 1 is maintained at a constant pressure.

As described above, in the fuel injection pump 1 of the present embodiment, the fuel groove 41 is formed in the inner wall 40*b* of the bush 40, so that a portion of fuel pressurized by the feed pump assembly 50 is supplied to the receiving chamber 24 through the fuel groove 41. Thus, the fuel passage, which connects between the feed pump assembly 50 and the receiving chamber 24, is formed between the drive shaft 15 and the bush 40, as shown in FIG. 1. As a result, it is not necessary to form a fuel passage, which is communicated with the receiving chamber 24, in the housing main body 11. Thus, the simplified structure of the fuel injection pump and the simplified manufacturing process of the fuel injection pump can be achieved.

Also, since the fuel groove 41 is communicated with the discharge port 63, the fuel, which is pressurized by the feed pump assembly 50, is supplied to the fuel groove 41. Thus, even when the open cross-sectional area of the fuel groove 41 is made smaller, the fuel is forcefully supplied to the fuel groove 41. As a result, fuel can be reliably supplied to the receiving chamber 24. Furthermore, the fuel, which flows the fuel groove 41, forms the oil layer or film between the drive shaft 15 and the bush 40. Thus, even when a relatively large pressure is exerted between the drive shaft 15 and the bush 40, seizing between the drive shaft 15 and the bush 40 can be restrained, allowing an increase in a fuel discharge pressure.

In the above embodiment, the open cross-sectional area of the fuel passage 64 is chosen to be smaller than that of the fuel groove 41, so that fuel is throttled by the fuel passage 64. This allows adjustment of a flow rate of fuel supplied from the feed pump assembly 50 to the receiving chamber 24. That is, the fuel passage 64 serves as the orifice, which adjusts the flow rate of fuel. Thus, it is not necessary to form an elongated hole, which serves as an orifice, in the housing main body 11. This allows achievement of the simplified structure and the simplified manufacturing process.

Furthermore, the fuel passage 64 can be easily formed, so that a flow rate of fuel, which is supplied to the receiving chamber 24 through the fuel passage 64, can be easily adjusted to a desired value by adjusting an open cross-sectional area of the fuel passage 64.

Also, in the above embodiment, the fuel groove 41 is angled relative to the central axis of the drive shaft 15, so that the oil layer or film is throughly formed in both the axial direction and the circumferential direction between the drive shaft 15 and the bush 40. Thus, seizing between the drive shaft 15 and the bush 40 can be restrained, and a fuel discharge pressure can be increased.

Additional advantages and modifications will readily occur to those skilled in the art. The invention in its broader terms is therefore, not limited to the specific details, representative apparatus, and illustrative examples shown and described.

What is claimed is:

1. A fuel injection pump comprising:

at least one movable member for pressurizing fuel;

a drive mechanism that drives the at least one movable member and includes a drive shaft;

a housing that includes at least one cylinder and a receiving chamber, which are communicated with each other, wherein each cylinder reciprocably supports a corresponding one of the at least one movable member therein and defines a pressurizing chamber in cooperation with the corresponding movable member, and the receiving chamber receives the drive mechanism;

a feed pump assembly that is driven by the drive shaft and pumps fuel to the pressurizing chamber, wherein the feed pump assembly includes a discharge port, through which pressurized fuel is discharged from the feed pump assembly toward the pressurizing chamber; and a tubular member that is arranged between the drive shaft and the housing in a radial direction of the drive shaft and includes a fuel groove formed in an inner wall of the tubular member, which is in sliding contact with the drive shaft, wherein the fuel groove communicates between the discharge port and the receiving chamber.

2. A fuel injection pump according to claim 1, wherein:

the feed pump assembly includes a washer that is engaged with the housing, wherein the washer includes the discharge port, a support hole, an intake port, and a fuel passage;

the support hole receives the drive shaft in a rotatable manner;

the intake port is arranged radially outward of the support hole, wherein fuel to be pressurized is taken into the feed pump assembly through the intake port;

the discharge port is arranged radially outward of the support hole; and the fuel passage communicates between the support hole and the discharge port and also communicates between the discharge port and the fuel groove.

3. A fuel injection pump according to claim 1, wherein the fuel groove is angled relative to the axis of the drive shaft.

4. A fuel injection pump according to claim 1, wherein an open cross-sectional area of the fuel groove is greater than that of the fuel passage.

5. A fuel injection pump according to claim 1, wherein the fuel groove extends helically along the inner wall of the tubular member.

6. A fuel injection pump according to claim 1, wherein the fuel groove is the only groove formed in the inner wall of the tubular member.

7. A fuel injection pump according to claim 2, wherein each of the intake port and the discharge port extends in a circumferential direction.

8. A fuel injection pump according to claim 2, wherein the intake port and the discharge port are generally symmetrically arranged about the support hole.

9. A fuel injection pump according to claim 2, wherein:

the feed pump assembly further includes a casing, an inner rotor and an outer rotor;

the casing receives the inner rotor and the outer rotor;

the inner rotor is placed radially inward of the outer rotor and is connected to the drive shaft such that the inner rotor is rotated by the drive shaft; and the washer is held between the casing and the housing.

10. A fuel injection pump according to claim 1, wherein the drive mechanism further includes:

a cam that is joined to the drive shaft such that the axis of the cam is eccentrically offset from the axis of the drive shaft, wherein the cam has a circular cross section; and a cam ring that is arranged radially outward of the cam, wherein an outer periphery of a cross section of the cam ring is polygonal.

* * * * *